June 13, 1933.  B. D. BEDFORD  1,914,192
ELECTRIC CONTROL CIRCUIT
Filed Sept. 2, 1930
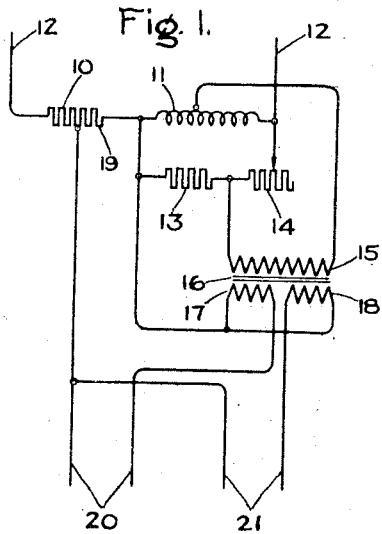
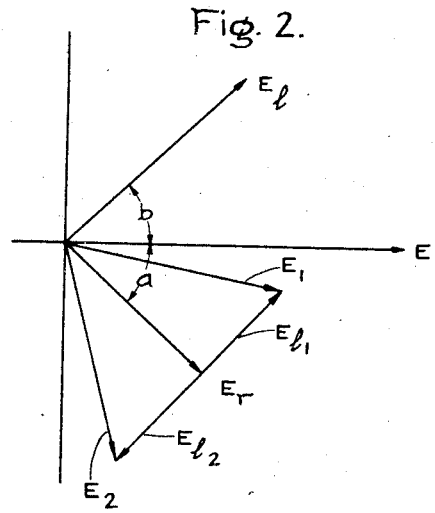
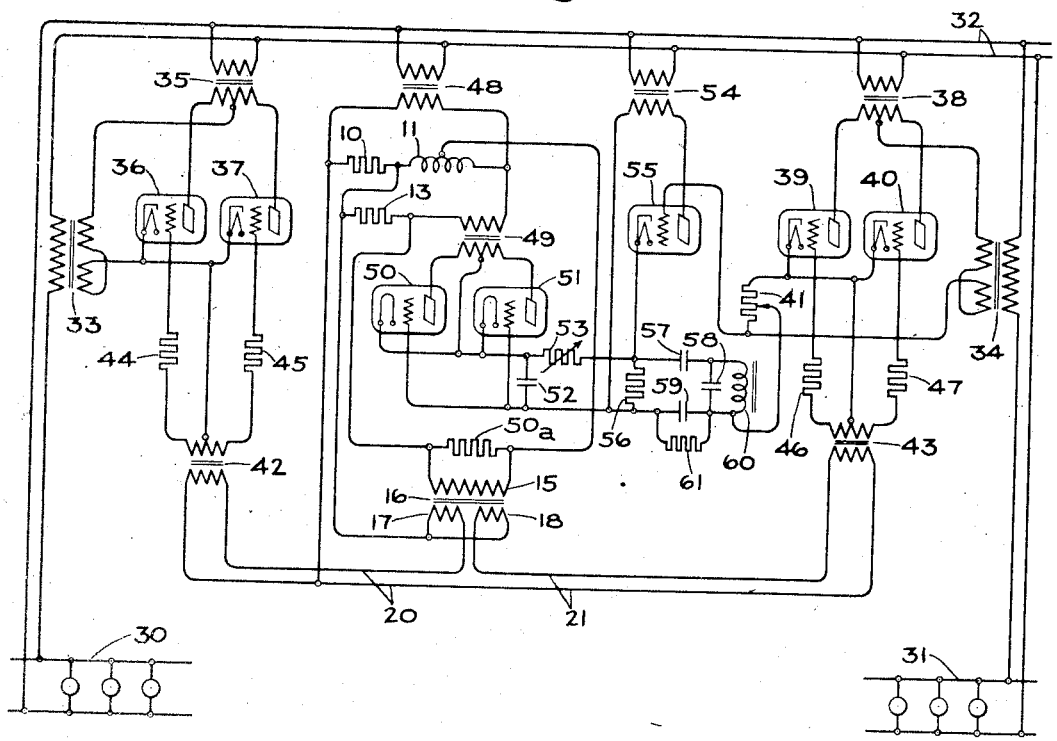
Inventor:
Burnice D. Bedford,
by Charles E. Tullar
His Attorney.

Patented June 13, 1933

1,914,192

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

ELECTRIC CONTROL CIRCUIT

Application filed September 2, 1930. Serial No. 479,405.

My invention relates to electric control systems and more particularly to such systems which make use of electric valves for controlling the flow of energy from an alternating current source to a load circuit.

It is generally known in the art that a very flexible control of electric circuits including electric valves may be obtained by providing means for shifting the phase of the grid potentials with respect to the anode potentials of the electric valves. For many applications, static phase shifting circuits, that is, circuits including various combinations of inductance, resistance and capacitance, have been found the most satisfactory from the standpoint of economy, simplicity and reliability.

It is an object of my invention to provide an improved static phase shifting circuit by means of which two derivative alternating potentials may be obtained, simultaneously and oppositely variable in phase with respect to potential of the source from which they are derived.

It is a further object of my invention to provide a control system for successively transferring current from an alternating current source to a pair of load circuits by the use of my improved phase shifting circuit.

In accordance with my invention I connect a pair of impedance elements across a source of alternating potential for producing dephased voltages and provide two output circuits, each including a portion of the potential across one of the impedance elements and a portion of the potential across another impedance element which is variable in magnitude and direction. The source of the variable potential is oppositely connected in the two output circuits with respect to the fixed potential. The potential of the output circuit is then the resultant of a fixed potential and a second potential constant in phase but variable in magnitude and direction.

In accordance with another feature of my invention I apply my improved phase shifting circuit to the control of a pair of lamp banks which it is desired to alternately and simultaneously dim and brighten. According to my invention a variable impedance, such as a saturating reactor, is connected in series with each of the lamp banks and the saturating winding of each of these reactors is energized through a pair of electric valves. The grid circuits of the electric valves associated with the two lamp bank circuits are excited from a phase shifting circuit, such as that described above, the variable potential being taken from an intermediate point of one of the impedance elements and an intermediate point of an impedance bridge connected in parallel with this element. The impedance of one arm of the bridge is controlled by a pair of auxiliary electric valves, preferably of the high vacuum electron discharge type, and the impedance of these valves is controlled by a capacitor connected in their grid circuit. This capacitor is adapted to be charged from the alternating current circuit through another electric valve and the conductivity of this last valve is controlled by the current in one of the saturating windings. In the grid circuit of this charging valve is included a high frequency alternating potential derived from the energy flowing through the valve, and a negative bias potential dependent upon the current flowing in one of the main electric valves for controlling the current in the saturating winding of one of the lamp banks. This negative bias is adapted to have a maximum value greater than the amplitude of the high frequency alternating potential. In general, the amount of current flowing in this saturating winding determines the bias in the grid circuit of the charging valve, which in turn determines in which direction the grid potentials of the main electric valves are to be shifted with respect to the anode potentials of these valves.

For a better understanding of my invention together with other and further objects thereof, reference is had to the accompanying drawing and its scope will be pointed out in the appended claims. In the drawing, Fig. 1 is a diagrammatic representation of my improved phase shifting circuit; Fig. 2 is a vector diagram to aid in the understanding of my phase shifting circuit, and Fig. 3 illustrates my improved phase shifting circuit as applied to the control of electric valves for dimming and brightening a pair of lamp banks.

In Fig. 1 I have illustrated my improved phase shifting circuit as including a resistor 10 and a reactor 11 connected across an alternating current circuit 12 and an impedance bridge connected across the reactor 11, illustrated as a fixed resistor 13 and a variable resistor 14. A portion of the potential across the reactor 11 is obtained by means of a circuit connecting the electrical midpoint of this reactor with a connection between the resistors 13 and 14. This circuit includes the primary winding 15 of a transformer 16 provided with two secondary windings 17 and 18. One of the output circuits 20 includes a portion 19 of the resistor 10 and the secondary winding 17 of the transformer 16. The other output circuit 21 includes the portion 19 of the resistor 10 and the secondary winding 18 of the transformer 16. Since the purpose of the transformer 16 is merely to insulate the potentials derived from the resistor and reactor, it will be obvious that it may be connected across the portion 19 of the resistor 10 if desired.

For a more complete understanding of the operation of the above described circuit reference is had to the vector diagram shown in Fig. 2. In this diagram the vector $E$ represents the voltage of the circuit 12 connected across the phase shifting circuit. The vector $E_r$ represents the component voltage across the resistor 10 which is in phase with the current in the circuit of the resistor 10 and the reactor 11 which current lags the impressed potential by the angle $a$ due to the reactance of the reactor 11. The vector $E_1$ represents the component voltage across the reactor 11 which leads the impressed voltage by the angle $b$. The potential across the resistors 13 and 14 is obviously the same as that across the reactor 11. If the resistance 13 is equal to the resistance 14 and the output circuit connects the electrical midpoint of the reactor 11 to the junction of the resistors 13 and 14, it is obvious that there will be zero potential in this circuit. If now the resistance 14 is decreased, there will be a potential in this circuit in phase with the potential across the reactor 11 and this potential will increase as the resistance of the resistor 14 is decreased. Conversely, if the resistance 14 is increased above that of the resistor 13, a potential will be included in this circuit which is opposite in phase with the potential across the reactor 11. The potential for a given setting of the resistor 14 is shown as the vector $E_{11}$. The output circuits 20 and 21 include a portion of the potential across the resistor 10 which is shown as the vector $E_r$. These two circuits include also respectively the oppositely connected secondaries 17 and 18 of the transformer 16 which may be represented by the vectors $E_{11}$ and $E_{12}$ respectively. Thus it is seen that the resultant voltages of the output circuits 20 and 21 are represented by the vectors $E_1$ and $E_2$. Since the vector $E_r$ remains practically stationary in phase the vectors $E_1$ and $E_2$ will be shifted in phase oppositely and simultaneously through approximately 180° as the resistance of the resistor 14 is varied from zero to infinity. While I have shown the impedance elements for dephasing the applied potential as the resistor 10 and the reactor 11, it will be obvious to those skilled in the art that any combination of resistance, reactance or inductance may be used to produce the desired phase difference in the component potentials without departing from my invention. Similarly, the resistance bridge comprising the resistors 13 and 14 may be replaced by any other impedance bridge, although with a bridge including reactance there will be a transient effect in the response of the output circuit to changes in the values of the impedance bridge. It will also be obvious to those skilled in the art that the potentials of the circuits 20 and 21 may be shifted at different rates by proper proportioning of the windings 17 and 18 or by including different portions of the resistor 10 in their circuits, all without departing from my invention.

Referring now to Fig. 3, I have illustrated my above described phase shifting circuit as applied to the control of an illumination circuit for alternately and simultaneously dimming and brightening a pair of lamp banks 30 and 31. The lamp banks 30 and 31 are energized from an alternating current circuit 32 through the saturating reactors 33 and 34 respectively. The saturating winding of the reactor 33 is adapted to be energized from the alternating current circuit 32 through a transformer 35 and controlled electric valves 36 and 37. Similarly the saturating winding of the reactor 34 is adapted to be energized from the circuit 32 through a transformer 38 and controlled electric valves 39 and 40. The electric valves 36, 37, 39 and 40 may be of any of the several types well known in the art, but I prefer to use vapor electric discharge valves. As shown, the saturating windings of reactors 33 and 34 are made up of two oppositely connected sections to avoid the inducing in the direct current circuit of an alternating potential from the alternating current circuit. The saturating circuit of the reactor 34 is shown as including a resistor 41 for the purposes hereinafter set forth.

The control of the current delivered by the electric valves 36, 37, 39 and 40 is effected by their grid circuits which are energized from the output circuits 20 and 21 of a phase shifting circuit through grid transformers 42 and 43 and current limiting resistors 44, 45, 46 and 47 respectively. The phase shifting circuit is energized from the alternating current circuit 32 through the transformer 48 and is similar to that described in connection with Fig. 1 with the exception that the resistor 14 is replaced by a series transformer 49, the secondary circuit of which includes a pair of auxiliary electric valves 50 and 51, preferably of the pure electron discharge type, which gives the transformer 49 a resistance characteristic. A resistor 50a may be connected across the primary winding 15 of the transformer 16 in order to decrease the impedance of this circuit.

In order to change the impedance of the series transformer 49 at a definite predetermined rate and thus shift the phase of the grid potential of the electric valves 36, 37, 39 and 40 at a predetermined rate to dim or brighten their corresponding lamp banks, I have connected a capacitor 52 in the grid circuits of the valves 50 and 51 so that the grid potential of these valves is dependent upon the charge on the capacitor. The broad idea of varying the impedance of an electric valve in response to the charge on a condenser and of using this variation of impedance to effect a shift in phase of one potential with respect to another potential forms no part of the present invention but is covered in a copending United States patent application of Alan S. Fitzgerald, Serial No. 485,960, filed October 2, 1930, and assigned to the same assignee as the present application.

I have provided a circuit for charging the capacitor 52 through a high resistor 53, which is preferably variable, from the alternating current circuit 32 by means of a transformer 54 and an electric valve 55 preferably of the vapor electric discharge type. The load circuit of the transformer 54 and the valve 55 includes a resistor 56, the potential across which is the charging potential of the capacitor 52. The resistors 53 and 56 also constitute the discharge circuit of the capacitor 52 when the electric valve 55 is non-conducting. The grid circuit of the electric valve 55, which might be called the master control element of the system, includes a negative bias potential derived from the resistor 41, which is provided with a variable contact and constitutes in effect a potentiometer, and a source of relatively high frequency alternating potential obtained from an oscillating circuit. This oscillating circuit comprises the capacitors 57, 58 and 59 and the reactor 60 connected in parallel to the capacitor 58. This oscillating circuit is energized across the resistor 56. The potential across the resistor 56 is high enough to generate appreciable current in the oscillating circuit only when current is flowing through the resistor 56 from the electric valve 55. The capacitor 59 may be shunted by a resistor 61 which provides a path for the grid current of the valve 55, and a leakage path for the energy of the oscillating circuit.

In explaining the operation of the above described apparatus, it will be assumed that the grid potentials of the electric valves 39 and 40 are in phase with their anode potentials and that these valves are delivering their maximum output. Under this condition, the maximum current is flowing in the saturating winding of the reactor 34 so that its impedance is a minimum and the lamp bank 31 will be illuminated to its maximum intensity. On the other hand, the grid potentials of the electric valves 36 and 37 will be completely out of phase with their anode potentials so that no current will flow in the saturating winding of the reactor 33. This reactor will have its maximum impedance and the lamp bank 30 will be completely dimmed. With the maximum current flowing in the circuit of the resistor 41 the negative bias potential of this resistor included in the grid circuit of electric valve 55 will have rendered that valve non-conducting so that charging current is no longer supplied to the capacitor 52. The capacitor 52 now commences to slowly discharge through the high resistance 53 and the resistor 56. The time required to complete the discharging of the capacitor 52 may be controlled by adjusting the value of the resistance 53. As the capacitor 52 discharges, its terminal potential drops so that the positive potential on the grid of electric valves 50 and 51 is decreased to increase their impedance. As the impedance of the electric valves 50 and 51 increases the impedance of the transformer 49 increases correspondingly and this effects an equal and opposite shift in phase of the potentials delivered by the output circuits 20 and 21 respectively, as explained in connection with Fig. 1. As the grid potentials of the electric valves 36, 37, 39 and 40 are shifted with respect to the anode potentials of these valves, the current in the saturating winding of the reactor 33 will increase while that in the saturating winding of the reactor 34 will decrease, the illumination of the lamp bank 30 will increase and that of the lamp bank 31 decrease. This transfer of current between the two lamp banks will continue at a rate depending upon the value of the resistance 53 through which the capacitor 52 discharges, until the current flowing in the saturating winding of the reactor 34 has reached approximately zero.

When the current in the saturating winding of the reactor 34 and the resistor 41 has dropped to approximately zero, the negative bias of the grid of the electric valve 55 will also be reduced to approximately zero and this valve will again become conducting. When the electric valve 55 becomes conducting it again supplies charging current to the capacitor 52 through the high resistance 53. This effects a shift in phase of the grid potentials of the electric valves 36, 37, 39 and 40 in an opposite direction. As the current again begins to build up in the saturating winding of the reactor 34 and in the resistor 41, a negative bias potential again appears in the grid circuit of the electric valve 55. Since an alternating potential is applied to the anode of this valve, this negative bias tends to stop the flow of current in the valve after a comparatively short time. However, I have provided means for overcoming this negative bias potential until it reaches a value corresponding to the maximum current delivered by the electric valves 39 and 40 to the saturating winding of the reactor 34. This means comprises the oscillating circuit made up of the capacitors 57, 58 and 59 and the reactor 60. As soon as current begins to flow in the circuit of the electric valve 55 and the potential appears across the terminals of the resistor 56, this potential supplies energy for an oscillating current in this oscillating circuit. This oscillating current creates an alternating potential in the grid circuit of the electric valve 55 which keeps this valve triggered, that is, alternate positive half cycles of this oscillating current have a sufficient amplitude to overcome the negative bias of the resistor 41 until the current in this resistor approaches the maximum output of electric valves 39 and 40. Since this oscillating current is of a very high frequency, the electric valve 55 is rendered conducting at approximately the beginning of each half cycle of positive anode potential. However, when the current through the electric valves 39 and 40 reaches its maximum value, the bias included in the grid circuit of the valve 55 from the resistor 41 is so proportioned as to have a magnitude greater than the maximum amplitude of the alternating potential supplied by the oscillating current so that the electric valve 55 is rendered non-conducting. Obviously, the above described cycle is repeated indefinitely.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. In combination with a source of periodic potential, apparatus for producing a potential variable in phase with respect to said source comprising a plurality of impedance elements connected across said source for producing dephased voltages substantially constant in magnitude and phase difference, and an output circuit including a portion of one of said impedance elements, and the secondary winding of a transformer the primary winding of which includes a portion, variable in magnitude and direction, of the potential across another impedance element.

2. In combination with a source of periodic potential, apparatus for producing a potential variable in phase with respect to said source, comprising a plurality of impedance elements connected across said source for producing dephased voltages substantially constant in magnitude and phase difference, a two arm impedance bridge, one of whose arms is variable, connected across one of said impedance elements, and an output circuit including a portion of one of said impedance elements and the secondary winding of a transformer, the primary winding of which is connected between intermediate points of said bridge and its cooperating impedance element.

3. In combination with a source of periodic potential, apparatus for producing two potentials simultaneously and oppositely variable in phase with respect to said source, comprising a plurality of impedances connected across said source for producing dephased voltages substantially constant in magnitude and phase difference, an output circuit including a portion of one of said impedance elements and a secondary winding of a transformer, the primary winding of which includes a portion, variable in magnitude and direction of the potential across another impedance element, and a second output circuit including a portion of one of said impedance elements and an oppositely connected secondary winding of said transformer.

4. In combination with a source of alternating potential, apparatus for producing two potentials simultaneously and oppositely variable in phase with respect to said source, comprising a resistor and a reactor connected across said source, a resistance bridge, one of whose arms is variable, connected in parallel to said reactor, an output circuit including a portion of said resistor and a secondary winding of a transformer, the primary winding of which is connected between intermediate points of said reactor and its cooperating bridge, and a second output circuit including the same portion of said resistor and an oppositely connected secondary winding of said transformer.

5. A system for effecting a transfer of current from an alternating current source between two load circuits comprising an electric valve provided with an anode, a cathode, and a control grid, associated with each of said load circuits for controlling the flow of current therein, grid exciting means for impressing upon the grids of said valves alternating potentials simultaneously and oppositely variable in phase with respect to the anode potentials of said valves, and means responsive to the current in one of said valve circuits for controlling the operation of said grid exciting means.

6. A system for continuously effecting a transfer of current from an alternating current source between two load circuits at a predetermined rate comprising an electric valve, provided with an anode, a cathode, and a control grid, associated with each of said load circuits for controlling the flow of current therein, means for impressing upon the grids of said valves alternating potentials simultaneously and oppositely variable in phase at a predetermined rate with respect to the anode potentials of said valves, and means responsive to a predetermined current in one of said valve circuits for initiating the reverse operation of said phase shifting means to transfer current to the other valve circuit.

7. A system for continuously effecting a transfer of current from an alternating current source between two load circuits at a predetermined rate comprising an electric valve provided with an anode, a cathode, and a control grid, associated with each of said load circuits for controlling the flow of current therein, means for impressing upon the grids of said valves alternating potentials simultaneously and oppositely variable in phase at a predetermined rate with respect to the anode potentials of said valves, said means including a static phase shifting circuit, means for changing the impedance of one of the elements of the phase shifting circuit at a predetermined rate, means responsive to a predetermined current in one of said valve circuits to reverse the operation of said impedance changing means and initiate a transfer of current to the other valve circuit, and means responsive to a different predetermined current in said first mentioned valve circuits to again reverse the operation of said impedance changing means and initiate a reverse transfer of current between said valve circuits.

8. A system for continuously effecting a transfer of current from an alternating current source between two load circuits at a predetermined rate comprising an electric valve, provided with an anode, a cathode, and a control grid, associated with each of said circuits for controlling the flow of current therein; means for impressing upon the grids of said valves alternating potentials simultaneously and oppositely variable in phase at a predetermined rate with respect to the anode potentials of said valves, said means including a static phase shifting circuit, an auxiliary electric valve for controlling said phase shifting circuit, an energy storage element associated with said auxiliary valve and connected to control the impedance thereof, means for storing energy in said element at a predetermined rate whereby the impedance of said auxiliary valve is decreased, the phase shift between the grid and anode potentials of one of said main valves is decreased and its conductivity increased, means for dissipating the stored energy at a predetermined rate, means responsive to a predetermined current in said last mentioned main valve circuit to arrest the operation of the energy storing means and to initiate the dissipation of the stored energy to transfer current to the other main valve circuit, and means responsive to a lower predetermined current in said first main valve circuit to restart the operation of said energy storage means and effect a transfer of current back to said first valve circuit.

9. A system for continuously effecting a transfer of current from an alternating current source between two load circuits at a predetermined rate comprising an electric valve provided with an anode, a cathode, and a control grid, associated with each of said circuits for controlling the flow of current therein, means for impressing upon the grids of said valves alternating potentials simultaneously and oppositely variable in phase at a predetermined rate with respect to the anode potentials of said valves, said means including a static phase shifting circuit having a plurality of elements, an auxiliary electric valve for controlling the impedance of one of said elements, a capacitor connected in the grid circuit of said auxiliary valve to control the potential of the grid, a charging circuit for said capacitor including a resistor, a source of alternating potential and a second auxiliary electric valve provided with a grid circuit including a source of relatively high frequency alternating potential derived from the circuit including said last mentioned valve and a negative bias potential proportional to the current in the circuit of one of the valves associated with a load circuit and having a maximum value greater than the amplitude of said high frequency potential, and a discharge circuit for said capacitor including a resistor.

10. In combination, a vapor electric valve provided with an anode, a cathode, and a control grid, an alternating current circuit including said valve, a grid circuit for said valve including a source of relatively high frequency periodic potential for normally keeping said valve substantially fully conducting, and a source of variable negative potential having a maximum value greater than the amplitude of said high frequency potential to render said valve completely non-conducting.

11. In combination, a vapor electric valve provided with an anode, a cathode, and a control grid, a source of alternating current, a load circuit connected to said source through said valve, a grid circuit for said valve including a relatively high frequency periodic potential derived from the energy passing through the valve and a source of variable negative potential, whereby said valve remains substantially fully conducting until the negative bias potential exceeds the amplitude of the high frequency potential, and then becomes completely non-conducting until said negative bias potential is reduced to substantially zero.

12. In combination, a source of alternating current, a vapor electric valve provided with an anode, a cathode, and a control grid, a load circuit connected to said source through said valve, a relatively high frequency oscillating circuit connected to receive energy from said load circuit whereby said circuit will oscillate only when current is flowing through said valve, a grid circuit for said valve including a potential derived from said oscillating circuit and a source of variable negative potential, whereby said valve remains substantially fully conducting until the negative bias potential exceeds the amplitude of the high frequency potential, and then becomes completely non-conducting until said negative bias potential is reduced to substantially zero.

13. The method of operating a vapor electric valve provided with an anode, a cathode, and a control grid, which comprises impressing an alternating potential upon its anode and impressing a relatively high frequency periodic potential and a variable negative bias potential upon its control grid in such a manner that said valve is substantially fully conducting until the negative bias potential exceeds the amplitude of the high frequency potential.

In witness whereof, I have hereunto set my hand this 29th day of August, 1930.

BURNICE D. BEDFORD.